United States Patent
Uji

(12)
(10) Patent No.: US 6,233,940 B1
(45) Date of Patent: May 22, 2001

(54) DUAL-PRESSURE STEM INJECTION PARTIAL-REGENERATION-CYCLE GAS TURBINE SYSTEM

(75) Inventor: Shigekazu Uji, Ichikawa (JP)

(73) Assignee: Ishikawajima-Harima Heavy Industries Co. Ltd., Tokyo (JP)

( * ) Notice: Subject to any disclaimer, the term of this patent is extended or adjusted under 35 U.S.C. 154(b) by 0 days.

(21) Appl. No.: 09/613,460

(22) Filed: Jul. 10, 2000

(30) Foreign Application Priority Data

Jul. 16, 1999 (JP) .................................................. 11-202962

(51) Int. Cl.[7] ....................................................... F01K 7/34
(52) U.S. Cl. ............................................. 60/653; 60/39.01
(58) Field of Search ......................... 60/653, 670, 39.182, 60/39.19, 39.01

(56) References Cited

U.S. PATENT DOCUMENTS

| | | | |
|---|---|---|---|
| 3,518,830 | * 7/1970 | Viscovich et al. | .................. 60/653 X |
| 5,392,606 | * 2/1995 | Labinov et al. | .................... 60/653 X |
| 5,896,740 | * 4/1999 | Shouman | ........................... 60/39.182 |
| 6,003,298 | * 12/1999 | Horner | ............................... 60/39.182 |

* cited by examiner

*Primary Examiner*—Hoang Nguyen
(74) *Attorney, Agent, or Firm*—Griffin & Szipl, P.C.

(57) ABSTRACT

In the partial-regeneration cycle gas turbine system wherein part of the air compressed by a compressor 2 is extracted before a combustor 3, mixed with steam, and after the mixed gas is superheated by exhaust heat of a turbine, and the mixed gas is injected into the combustor, high-pressure steam is used as a fluid for driving a first mixer 22 that compresses extracted air, to increase the ratio of extracted air to steam, and then this mixed gas of extracted air and steam is further mixed with low-pressure steam from a low-pressure exhaust heat boiler, in a second mixer, and the mixture of gas is superheated in a superheater 6 by exhaust heat of the turbine, and injected into the combustor. Thus, the pressure of the driving steam can be raised, an exergy loss in an exhaust heat recovery portion can be reduced, and the efficiency of power generation can be increased without reducing the flow of generated steam.

4 Claims, 7 Drawing Sheets

DUAL-PRESSURE STEM INJECTION PARTIAL-REGENERATION-CYCLE GAS TURBINE SYSTEM

BACKGROUND OF THE INVENTION

1. Technical Field of the Invention

The present invention relates to a gas turbine power generating system that generates electric power and steam, and more particularly to a binary-fluid-cycle gas turbine system wherein steam is injected into the gas turbine.

2. Prior Art

A binary-fluid-cycle gas turbine system known in the prior art, wherein steam is injected into the gas turbine, is disclosed, for example, in the Japanese patent publication No. 34865, 1979 "Dual-action fluid heat engine."

This binary-fluid-cycle gas turbine system (called the Cheng cycle from the name of the inventor) is typically as shown in FIG. 1. The system consists of a choke valve 1, compressor 2, combustion chamber 3, water treatment equipment 4, pump 5, heat exchanger 6, turbines 7 and 8, condenser 9, etc. In the system, air drawn in from the atmosphere is compressed by the compressor 2 and supplied to the combustion chamber 3, and fuel is burned in the compressed air to produce a high-temperature combustion gas, and this combustion gas is used in turbines 7 and 8 thereby driving the compressor 2 and a load. Furthermore, steam is produced in the heat exchanger 6 using the combustion gas output from the turbines, and the condenser 9 removes moisture from the exhaust gas before it is discharged into the atmosphere.

Such a Cheng cycle as described above, has the advantage that the output and thermal efficiency of the turbine can be increased because the flow of combustion gas entering the turbine is larger and the specific heat of the combustion gas is increased because the steam S produced in the heat exchanger 6 is injected into the combustion chamber 3.

The inventor of the present invention developed a binary-fluid-cycle gas turbine system which is an improvement on the aforementioned Cheng cycle, and has applied for a patent in the Japanese patent publication No. 26780, 1996.

The "partial-regeneration binary-fluid gas turbine" disclosed in the Japanese patent publication No. 26780, 1996 is shown schematically in FIG. 2. That is comprised of a gas turbine system provided with a compressor 2 for compressing air, a combustor 3 in which fuel is burned, and a turbine 7 driven by combustion gas and driving the compressor, a mixer 10 using steam S (saturated steam) as the driving source for boosting the pressure of the compressed air and in which the fluids are mixed, a superheater 6 provided downstream of the turbine 7 for heating the mixed gas produced in the mixer 10 using turbine exhaust, an exhaust heat boiler 12 located downstream of the superheater 6 for evaporating water using the turbine exhaust as the heat source, an air line 13 for introducing part of the compressed air produced in the compressor 2 into the combustor 3 and the rest into the mixer 10, a main steam line 14 for transferring part of the steam S produced in the exhaust heat boiler 13 to the mixer, and a mixed gas line 15 for introducing the mixed gas produced in the mixer 10 into the combustor 3 via the superheater 6.

In this partial regeneration binary-fluid gas turbine, steam S is produced by the exhaust heat discharged from the gas turbine, drawn in and mixed with part of the compressed air, and after being heated in the superheater 6 by the exhaust from the gas turbine, the steam is injected into the combustor. Therefore, this type of gas turbine can recover more energy than with a Cheng cycle by the amount corresponding to the temperature increase of the air which is heated by the exhaust from the gas turbine, so the efficiency of the cycle can be increased.

FIGS. 3 and 4 are exhaust heat recovery diagrams for the aforementioned Cheng cycle and the binary-fluid gas turbine. In the figures, the abscissas and ordinates are the heat content of the exhaust gas of the gas turbine during the heat exchange and temperature, respectively. More precisely, the abscissa shows the enthalpy of the exhaust gas from the gas turbine using 0° C. as the reference.

In FIGS. 3 and 4, exhaust gas from the gas turbine is cooled from about 550° C. to about 150° C., and correspondingly, the water is heated up to saturation temperature at which the water is evaporated to produce saturated steam, and then it is further heated to produce superheated steam.

In the Cheng cycle in FIG. 3, after evaporation only the steam is heated to recover heat, however, in the partial regeneration binary-fluid gas turbine system shown in FIG. 4, a gas mixture of steam and air is heated. Therefore, in FIG. 4, the temperature of the gas increases when it is mixed with the compressed air, and also the flow of the mixed gas is increased, so the gradient of the temperature increase is reduced. As a result, an amount of energy corresponding to the hatched area shown in FIG. 4 is effectively utilized more than in the Cheng cycle, so the cycle efficiency is increased correspondingly. Consequently, in this example, the efficiency at the generator end increases from 41.10% to 41.18%.

With the partial-regeneration binary-fluid gas turbine system shown in FIG. 4, the amount of compressed air drawn in the mixer 10 should be increased in order to increase the cycle efficiency. However, if the pressure of the steam produced by the exhaust heat and which drives the mixer is solely increased, the flow of the steam to the mixer 10 is reduced, and as a result, the amount of heat recovered becomes insufficient.

FIG. 5 shows an example of this situation in which the steam pressure is increased from the 20 kg/cm$^2$g of FIG. 4 to 63 kg/cm$^2$g. Under these conditions, the temperature of the saturated steam is increased from about 210° C. to about 280° C., which means it is closer to the temperature of the exhaust gas. The area between lines for the temperature of the steam and the exhaust gas correspond to the so-called exergy loss (inactive energy), therefore, this is an improvement to some extent, but because the flow of generated steam decreases there is a resulting reduction in the flow of feed water, consequently the heat in the exhaust gas can be recovered only down to about 200° C., so the amount of recovered energy corresponding to the hatched area in FIG. 5 is smaller than that in FIG. 4. Hence, the efficiency at the generator terminals for this example in FIG. 5 is decreased to 40.96% from the 41.18% in the case FIG. 4.

SUMMARY OF THE INVENTION

The present invention is aimed at solving these problems. More explicitly, an object of the present invention is to provide such a partial-regeneration binary-fluid gas turbine wherein the pressure of the driving steam is increased without reducing the flow of generated steam, thereby reducing the exergy loss in the exhaust heat recovery portion, and increasing the efficiency of power generation.

According to the present invention, a dual-pressure steam-injection-type partial-regeneration-cycle gas turbine is provided in the partial-regeneration-cycle gas turbine system wherein part of the air compressed in the compressor (2) is extracted before the combustor (3) and mixed with steam, and after being superheated by exhaust heat from the turbine, the mixed gas is injected into the combustor; high-pressure steam is used as the fluid for driving the mixer that compresses the extracted air, thereby increasing the ratio of extracted air to steam, furthermore low-pressure steam taken from the low-pressure exhaust heat boiler is mixed with the gas mixture of extracted air and steam, and then the mixture of the mixed gas and the low-pressure steam is superheated by exhaust heat from the turbine and the mixture is injected into the combustor.

According to the aforementioned configuration of the present invention, the pressure of the exhaust heat recovery steam is raised and the resultant high-pressure steam is used as the driving source for the mixer. Therefore the ratio of extracted air to steam is increased, so that the flow of compressed air drawn in at the mixer can be increased. Also because low-pressure steam from the low-pressure exhaust heat boiler is mixed with the gas mixture of extracted air and steam, so a greater amount of air and steam than with a conventional system can be supplied to the combustor. Thereby there is an increase in the flow of exhaust gas from which heat can be recovered, therefore, after exhaust heat has been recovered from this exhaust gas once by generating high-pressure steam, additional exhaust heat can be recovered by generating low-pressure steam, that is, the heat in the exhaust gas can be utilized down to a low temperature.

The above-mentioned configuration of the present invention, therefore, can increase the flow of compressed air, which is useful for recovering exhaust heat, and at the same time, the amount of exhaust heat recovered in the low-temperature range of the exhaust gas is increased, thereby the exergy loss in the exhaust heat recovery portion can be reduced and the efficiency of power generation can be made higher.

According to a preferred embodiment of the present invention, the system is provided with a first mixer (22) that boosts the pressure of the compressed air using high-pressure steam as the driving source and in which the two fluids are mixed, a second mixer (24) that further mixes the mixed gas produced in the first mixer with low-pressure steam, a superheater (6) provided downstream of the turbine (7) for heating the mixture of gas produced in the second mixer with exhaust heat from the turbine, and an exhaust heat boiler (26) located downstream of the superheater for producing high-pressure steam and low-pressure steam using exhaust from the turbine as the heat source.

Using an ejector, for example, as the first mixer (22), the pressure of the compressed air of about 15 ata can be further boosted to the pressure of the low-pressure steam (for instance, about 20 ata), and the two fluids can be mixed. Also because high-pressure steam and low-pressure steam are generated in the exhaust heat boiler (26) using exhaust from the turbine as the heat source, the amount of heat recovered from the exhaust gas in the low-temperature range of the exhaust gas can be increased, thereby reducing the exergy loss in the heat recovery portion.

Other component devices of the present invention include an air line (13) that supplies part of the compressed air produced in the compressor (2) to the combustor (3) and the rest to the first mixer (22), a main steam line (28a) for supplying high-pressure steam produced in the exhaust heat boiler (26) to the first mixer, a secondary steam line (28b) for supplying low-pressure steam produced in the exhaust heat boiler (26) to the second mixer, and a mixed gas line (15) that transfers the gas mixture produced in the second mixer to the combustor 3 via the superheater 6.

Using this configuration, the main steam line (28a) and the secondary steam line (28b) are independent from each other and their pressures, temperatures, flows, etc. can be set to give optimum conditions.

Moreover, the aforementioned first mixer (22) should preferably be an ejector which is driven by high-pressure steam and draws in compressed air, and the above-mentioned second mixer (24) can preferably be a mixing vessel in which the mixed gas and the steam have substantially the same pressure.

Using the configuration mentioned above, the ejector is injected with high-pressure steam, and air from the outlet of the compressor of the gas turbine can be drawn in and mixed with the high-pressure steam, the driving fluid, thereby it is easy to produce a mixture of air and steam with a pressure that is higher than that of the compressed air, so that exergy loss can be avoided in the second mixer and the mixed gas can be mixed with the steam with a high efficiency.

DESCRIPTION OF PREFERRED EMBODIMENTS

Figure 1:
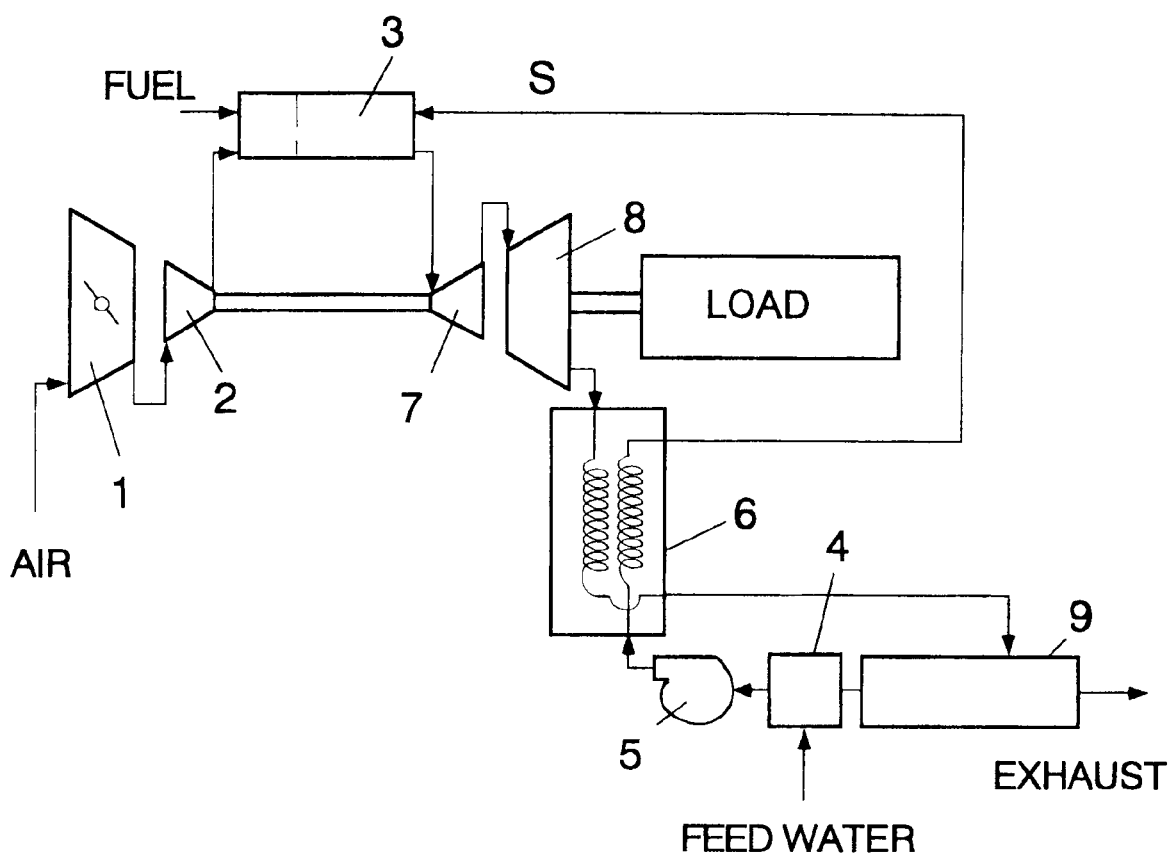
FIG. 1 shows the general configuration of a conventional binary-fluid-cycle gas turbine system.
Figure 2:
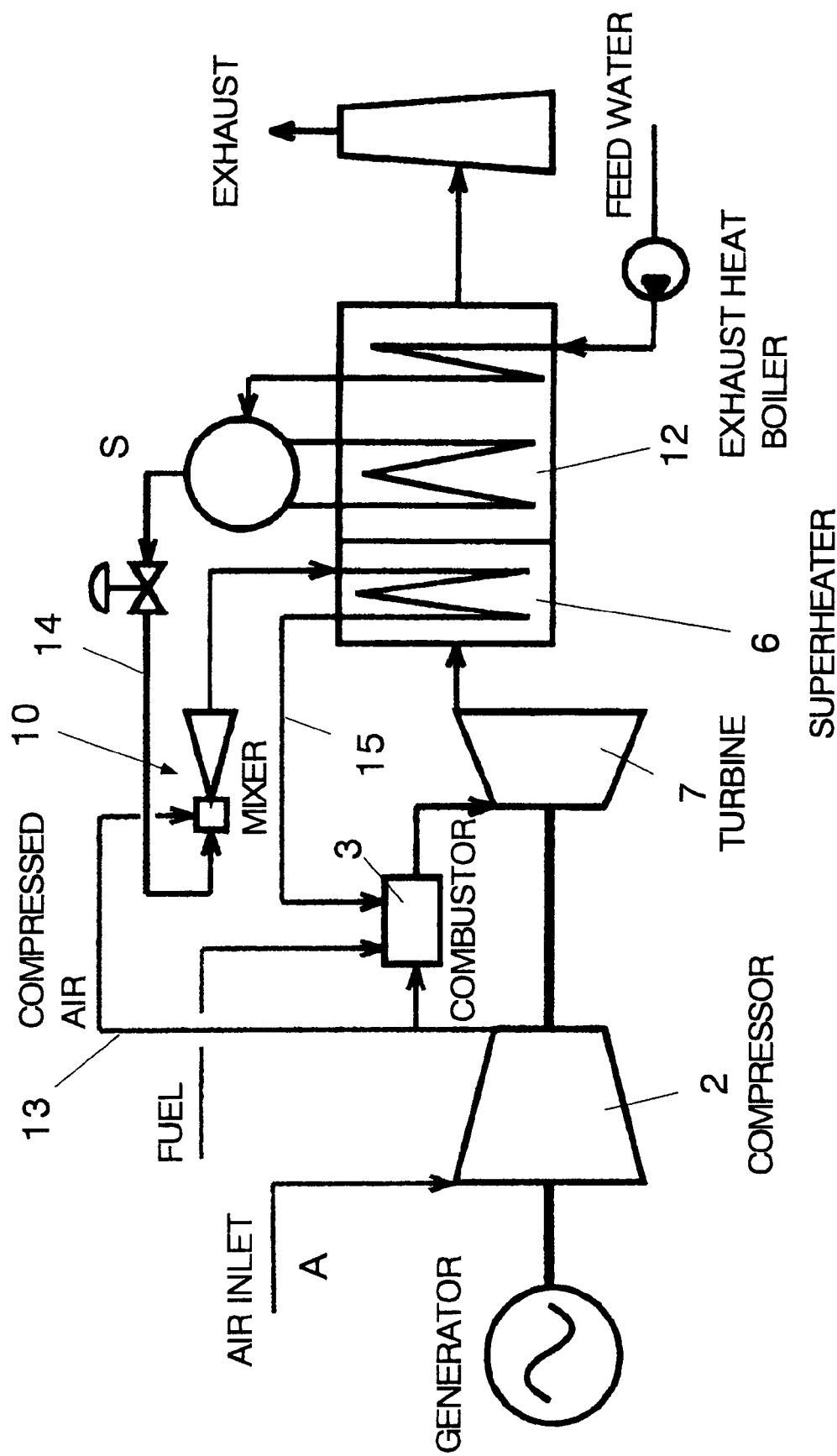
FIG. 2 shows the general configuration of the partial-regeneration binary-fluid-cycle gas turbine system.

Preferred embodiments of the present invention are described below referring to the drawings. When the same parts appear in different figures, they are identified with the same part numbers.

Figure 6:
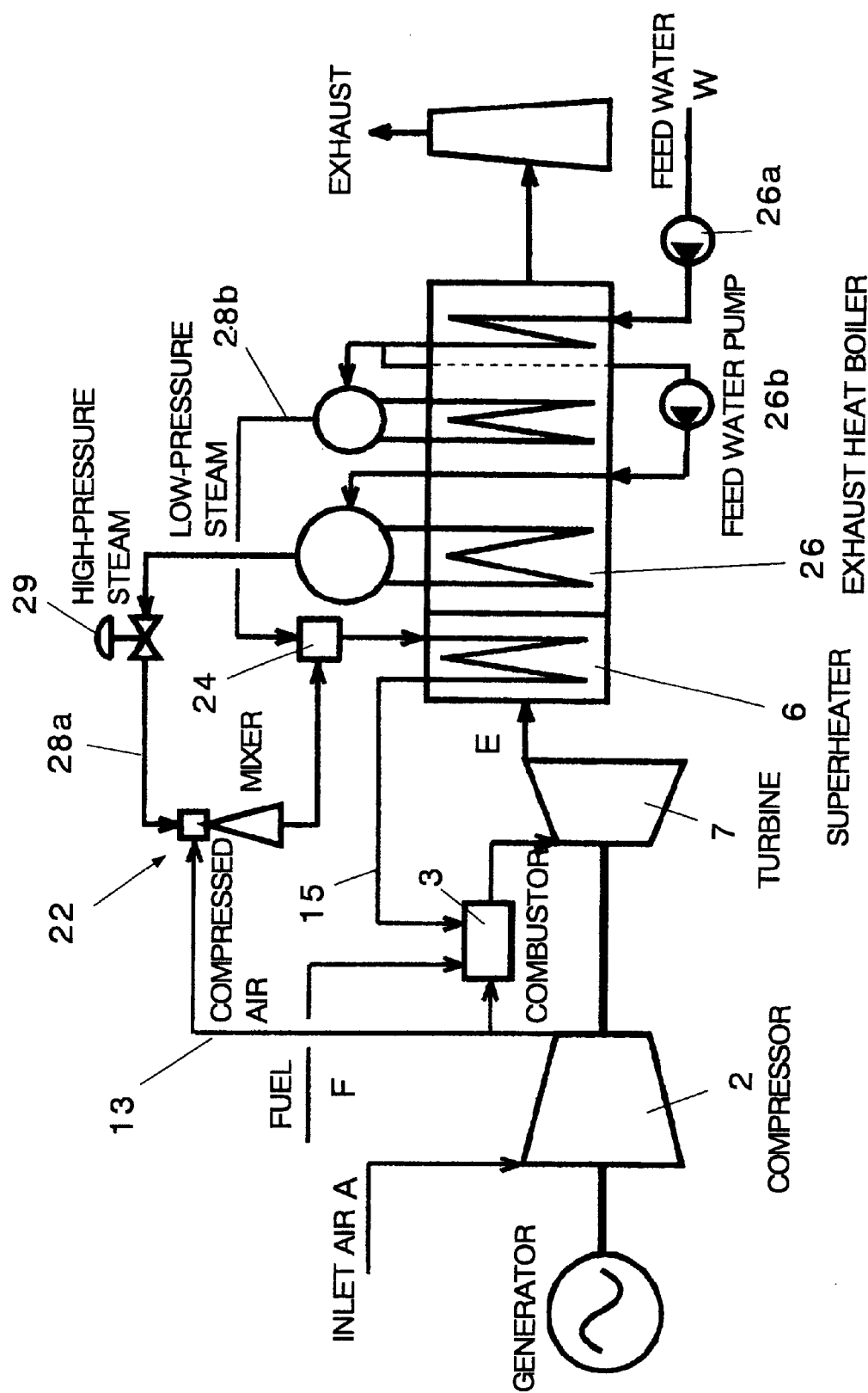
FIG. 6 shows the general configuration of the dual-pressure steam-injection-type partial-regeneration-cycle gas turbine system according to the present invention.

FIG. 6 is a diagram showing the general configuration of the dual-pressure steam-injection-type partial-regeneration-cycle gas turbine according to the present invention. In the figure, the partial-regeneration-cycle gas turbine system according to the present invention is provided with a gas turbine configured with a compressor 2 for compressing air A, a combustor 3 for burning a fuel F, and a turbine 7 driven by combustion gas E which drives the compressor 2, a superheater 6 located downstream of the turbine 7, an air line 13 for supplying part of the compressed air produced in the compressor 2 to the combustor and the rest to the mixer, and a mixed gas line 15 for transferring the air and steam mixture (gas mixture) to the combustor 3 via the superheater 6.

Other component devices of the partial-regeneration-cycle gas turbine system according to the present invention include a first mixer 22 driven by high-pressure steam for boosting the pressure of the compressed air and mixing the two fluids, a second mixer 24 that further mixes the mixed gas produced in the first mixer 22 with low-pressure steam, and an exhaust heat boiler 26 located downstream of the superheater 6 for producing high-pressure steam and low-pressure steam using the exhaust from the turbine as the heat source. The superheater 6 installed downstream of the turbine 7 additionally heats the gas mixture produced in the second mixer 24 using exhaust heat from the turbine. The exhaust heat boiler 26 is provided with a low-pressure water supply pump 26a and a high-pressure water supply pump 26b, and produces low-pressure steam at about 20 kg/cm$^2$g and high-pressure steam at about 63 kg/cm$^2$g, for example.

In this embodiment, the first mixer 22 is an ejector driven by high-pressure steam which draws in compressed air. The second mixer 24 is a mixing vessel in which the mixed gas from the first mixer 22 and the steam (low-pressure steam) are at substantially the same pressure. A mixing device of any other type with a small pressure loss can also be used as the second mixer 24.

In addition, the pressure at the outlet of the first mixer 22 is set to be at substantially the same pressure as the low-pressure steam, while the pressure at the outlet of the second mixer 24 is adjusted to the inlet pressure required for the superheater. This configuration allows the steam and the mixed gas to be mixed in the mixing vessel with a small exergy loss.

Furthermore, the partial-regeneration-cycle gas turbine system according to the present invention is also provided with a main steam line 28a for supplying high-pressure steam produced in the exhaust heat boiler 26 to the first mixer 22, and a secondary steam line 28b that transfers low-pressure steam produced in the exhaust heat boiler 26 to the second mixer 24. In addition, a high-pressure steam flow adjusting valve 29 is installed in the main steam line 28a, to adjust the steam flow to the mixer 22.

Figure 7:
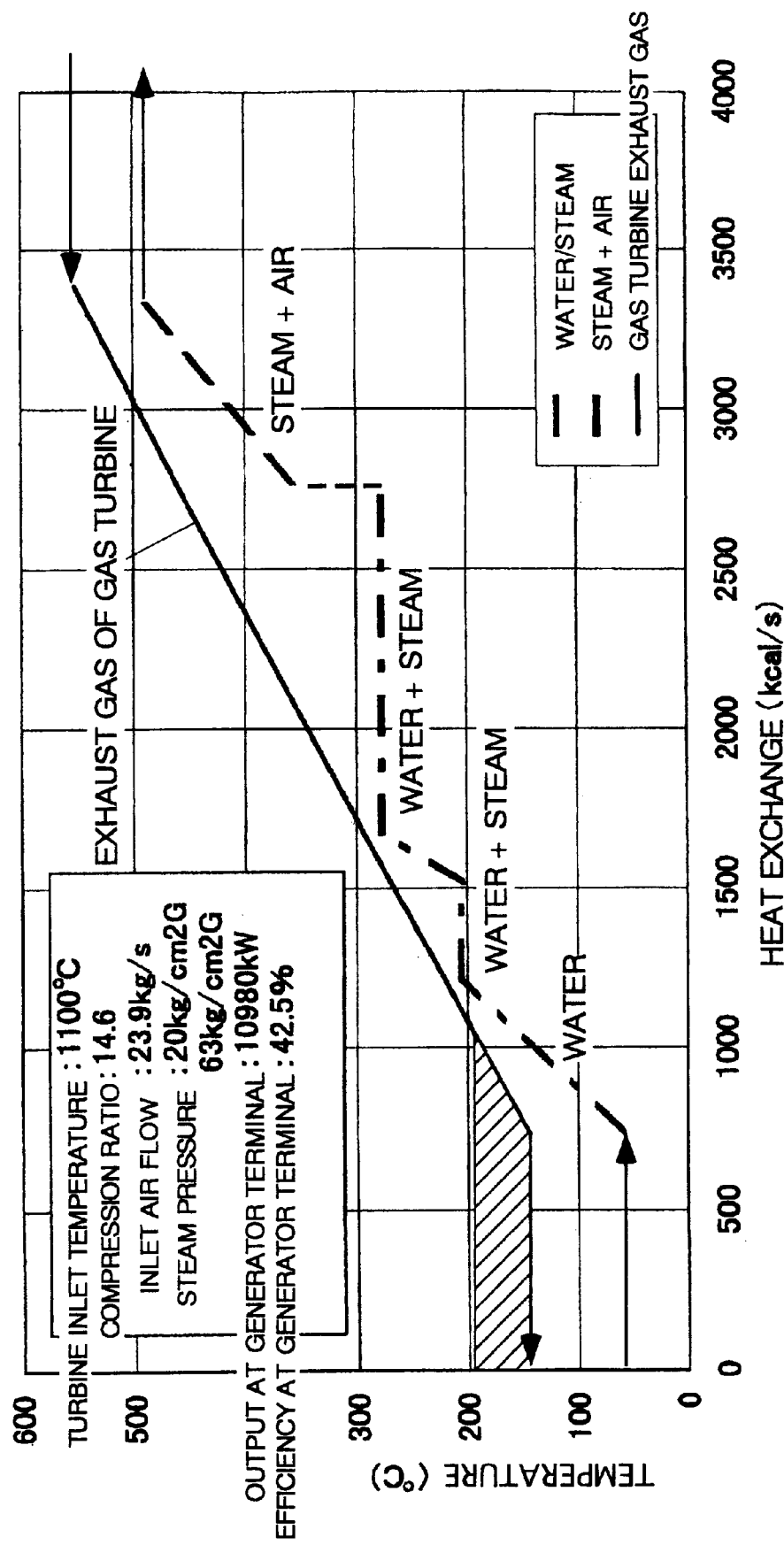
FIG. 7 is an exhaust heat recovery diagram for the system shown in FIG. 6.

FIG. 7 is a diagram showing the exhaust heat recovery for the system shown in FIG. 6. In the figure, the heat content of the exhaust from the gas turbine (enthaly relative to a base of 0° C. exhaust gas from the gas turbine) is plotted along the abscissa, and temperature is plotted as the ordinate.

Figure 3:
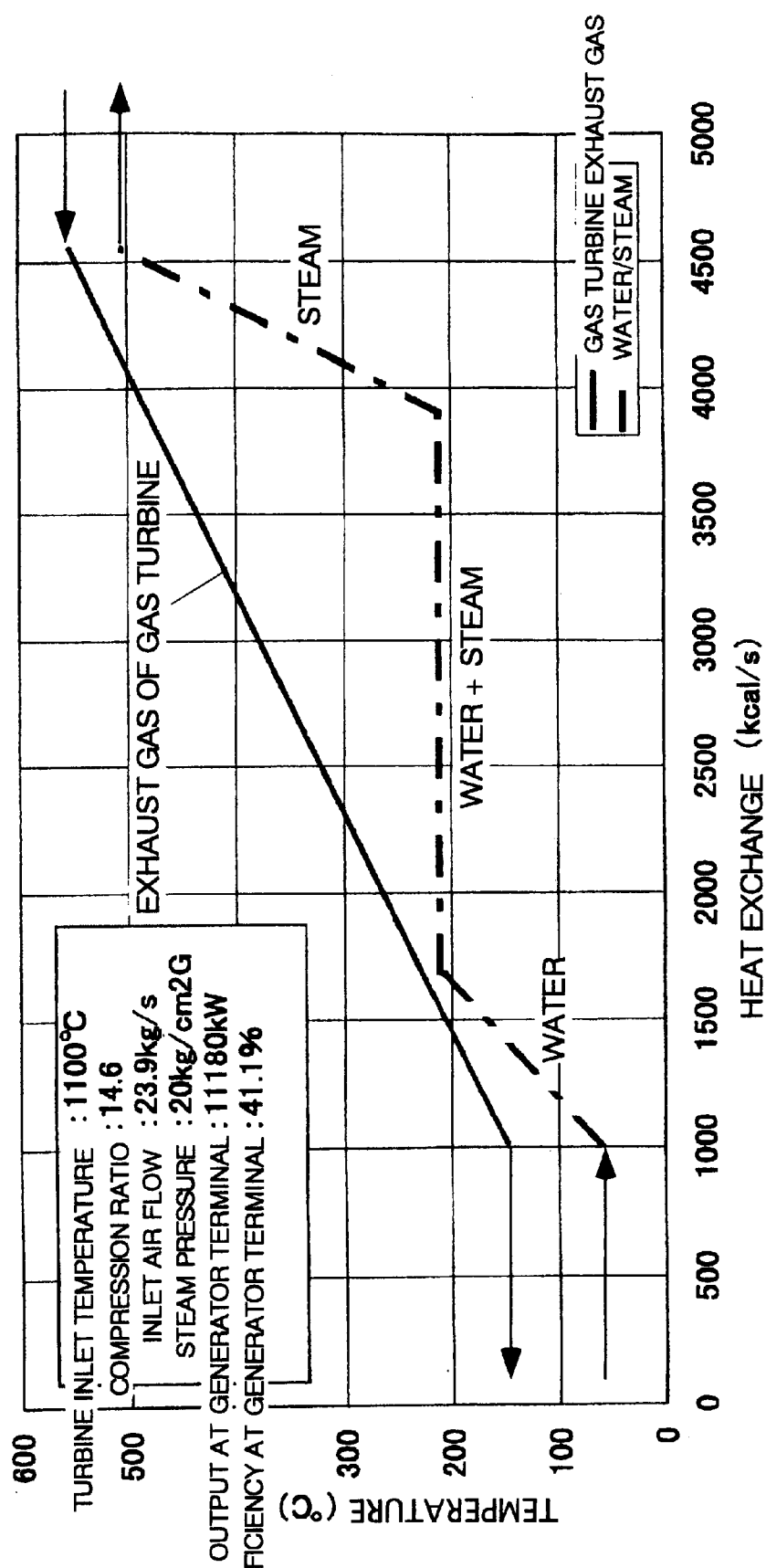
FIG. 3 is a diagram showing the exhaust heat recovery curves for the system in FIG. 1.
Figure 4:
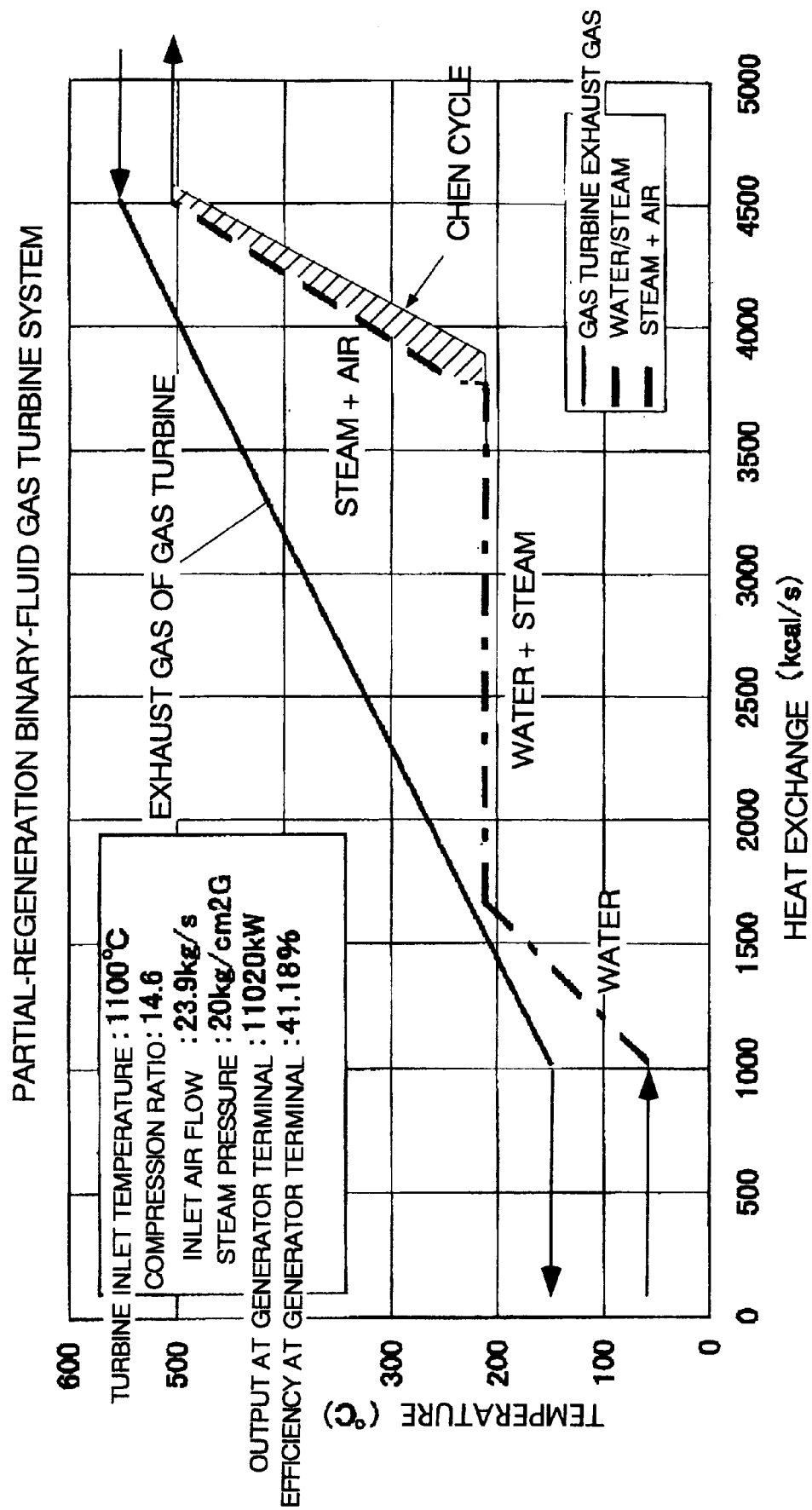
FIG. 4 is a diagram showing the exhaust heat recovery curves for the system in FIG. 2.

In FIG. 7, the exhaust from the gas turbine is cooled from about 550° C. to about 150° C. in the same way as in FIGS. 3 and 4, and the corresponding amount of heat heats the water to the saturation temperature at which the water is evaporated to produce saturated steam which is then further heated to produce superheated steam.

As can be seen in FIG. 6, the exhaust heat boiler 26 is supplied with water (at about 50° C., for instance) from the low-pressure feed water pump 26a, and part of the water is converted to low-pressure saturated steam (at about 20 kg/cm$^2$g, for example) and supplied to the second mixer 24 through a low-pressure drum and the secondary steam line 28b. The evaporation line for this low-pressure steam is the line at a constant temperature of about 210° C. in FIG. 7.

Next, the rest of the feed water is fed into a high-pressure drum by the high-pressure feed water pump 26b, and high-pressure steam (in this case, high-pressure saturated steam) is produced further upstream in the boiler. This high-pressure steam is supplied to the first mixer 22 through the high-pressure steam flow adjusting valve 29 and the main steam line 28a. The evaporation line for this high-pressure steam is the line at the constant temperature of about 280° C. in FIG. 7. In fact, the temperature of the mixed gas produced in the first mixer 22 is increased to about 360° C.

During subsequent heating in the superheater 6, since low-pressure steam was added in the second mixer 24, the flows of both air and steam are higher than in the case of a conventional system, and the rate of temperature increase is less steep.

Obviously from this exhaust heat recovery diagram, the configuration of the present invention provides two places in which the temperatures of the saturated steam have constant levels of about 210° C. and about 280° C. each of which is close to the temperature of the exhaust gas. Therefore, the area between the exhaust heat recovery curve and the exhaust gas temperature curve, that is the so-called exergy loss (inactive energy) is small. In addition, the total volume of generated steam is also increased, and as a result, the flow of the feed water supply increases too, consequently, heat in the exhaust gas can be recovered down to a gas temperature of about 150° C.

Figure 5:
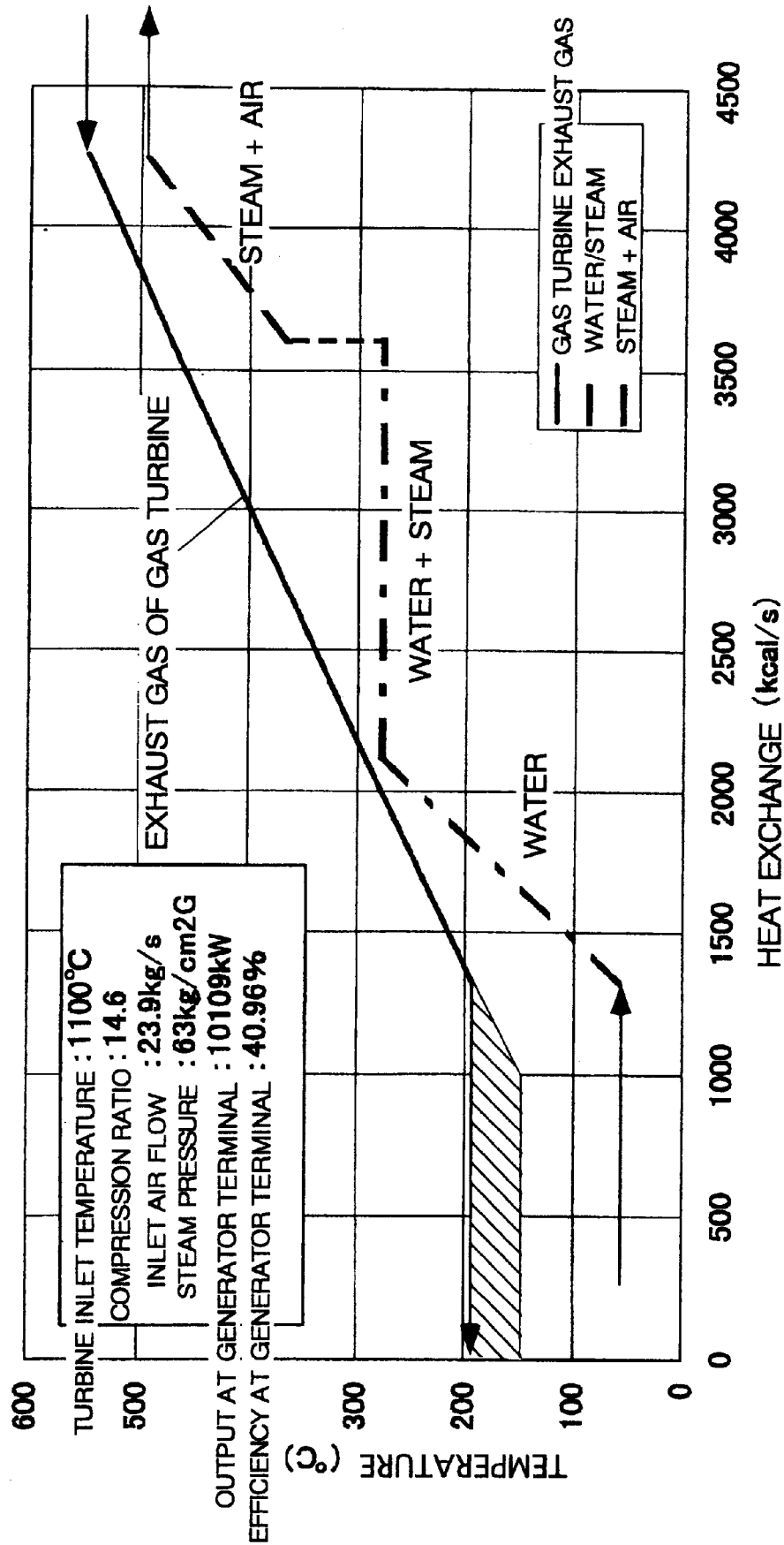
FIG. 5 is another exhaust heat recovery diagram for the system shown in FIG. 2.

Hence, the recovered energy corresponding to the hatched area shown in FIG. 7 is greater than that in FIG. 5; obviously with this example, the efficiency at the generator end can be improved from the conventional maximum of about 41.18% to 42.5%, that is, by about 3 to 5%.

According to the configuration of the present invention, as described above, because high-pressure steam produced by increasing the pressure of the exhaust heat recovery steam is used to drive the first mixer 22, the ratio of extracted air to steam can be raised, and the flow of compressed air drawn in at the mixer 22 can be increased. In addition, because the mixture of air and steam produced in this way is mixed with low-pressure steam from the low-pressure exhaust heat boiler, more air and steam can be supplied to the combustor than in a conventional system known in the prior art. As a result, the flow of exhaust gas from which heat is recovered becomes greater, and the heat in this exhaust gas can be used to produce high-pressure steam and then low-pressure steam, so that heat can be recovered from the exhaust gas down to a low temperature with a small exergy loss.

Using this configuration, the flow of compressed air that can be used to recover exhaust heat can be increased, while also the heat recovered in the low-temperature range of the exhaust gas can be made greater, so that the exergy loss in the exhaust heat recovery portion can be reduced, and the efficiency of power generation can be increased as well.

Also, by using an ejector, for example, as the first mixer 22, the pressure of the compressed air of about 15 ata can be increased further to the pressure of the low-pressure steam (for instance, about 20 ata), and both fluids can be mixed together. Furthermore, as high-pressure steam and low-pressure steam are produced in the exhaust heat boiler 26 using the exhaust from the turbine as the heat source, the heat to be recovered in the low-temperature range of the exhaust gas can be increased, thereby reducing the exergy loss in the exhaust heat recovery portion.

Using the configuration with a main steam line 28a and a secondary steam line 28b, both lines are independent from each other, and the pressures, temperatures, flows, etc. thereof can be set to give optimum conditions.

In addition, the ejector draws in air from the outlet of the compressor of the gas turbine by the injected flow of high-pressure steam, mixes the air with high-pressure steam that is the driving fluid, and a mixture of air and steam with a pressure higher than that of the compressed air can be easily obtained. The mixing vessel with a low pressure loss can reduce the exergy loss and efficiently combine the mixed gas and steam.

The dual-pressure steam injection partial-regeneration-cycle gas turbine system according to the present invention can increase the pressure of the driving steam without reducing the amount of steam generated, thereby the exergy loss in the exhaust heat recovery portion can be reduced, and the efficiency of power generation can be improved, etc., which are preferred advantages.

Although the present invention has been described by referring to several preferred embodiments, it is understood that the scope of rights included in the invention should not be limited only to these embodiments. Conversely, the scope of rights of the present invention covers all modifications, corrections and equivalent entities in the attached claims.

What is claimed is:

1. In the partial-regeneration-cycle gas turbine system wherein a part of compressed air produced in a compressor (2) is extracted before a combustor (3), mixed with steam, and after being superheated by exhaust from the turbine, the mixed gas is injected into the combustor, a dual-pressure steam injection partial-regeneration-cycle gas turbine system; wherein high-pressure steam is used as a fluid for driving a mixer that compresses the extracted air, thereby the ratio of the extracted air to steam is increased, the gas mixture of extracted air and steam is mixed with low-pressure steam from a low-pressure exhaust heat boiler, and after the mixture of gas is superheated by exhaust heat from the turbine, the mixture of gas is injected into the combustor.

2. The dual-pressure steam injection partial-regeneration-cycle gas turbine system specified in claim 1, comprising a first mixer (22) for boosting the pressure of a first fluid of compressed air using a second fluid of high-pressure steam as a driving source, and mixing both said fluids, a second mixer (24) for further mixing low-pressure steam with the mixed gas produced at the first mixer, a superheater (6) disposed downstream of a turbine (7) for heating the mixture of gas using exhaust from the turbine, and an exhaust heat boiler (26) disposed downstream of the superheater for producing high-pressure steam and low-pressure steam using exhaust from the turbine as a heat source.

3. The dual-pressure steam injection partial-regeneration-cycle gas turbine system specified in claim 2, comprising an air line (13) for supplying part of compressed air produced by the compressor (2) to the combustor (3) and the remainder thereof to the first mixer (22), a main steam line (28*a*) for transferring high-pressure steam produced in a exhaust heat boiler (26), a secondary steam line (28*b*) for supplying low-pressure steam produced in the exhaust heat boiler (26) to the second mixer, and a mixed gas line (15) for supplying the mixture of gas produced in the second mixer to the combustor (3) via the superheater (6).

4. The dual-pressure injection partial-regeneration-cycle gas turbine system specified in claim 2, wherein the said first mixer (2) is an ejector driven by high-pressure steam for drawing in compressed air, and the said second mixer (24) is a mixing vessel in which pressures of the mixed gas and steam are substantially the same as each other.

* * * * *

UNITED STATES PATENT AND TRADEMARK OFFICE
CERTIFICATE OF CORRECTION

PATENT NO. : 6,233,940 B1
DATED : May 22, 2001
INVENTOR(S) : Shigekazu Uji

It is certified that error appears in the above-identified patent and that said Letters Patent is hereby corrected as shown below:

Title page,
Please correct the title to read -- DUAL-PRESSURE STEAM INJECTION PARTIAL-REGENERATION-CYCLE GAS TURBINE SYSTEM.

Signed and Sealed this

Eleventh Day of December, 2001

Attest:

*Nicholas P. Godici*

NICHOLAS P. GODICI
*Attesting Officer*   *Acting Director of the United States Patent and Trademark Office*